J. LOSEE.
Improvement in Door-Springs.
No. 129,574.  Patented July 16, 1872.
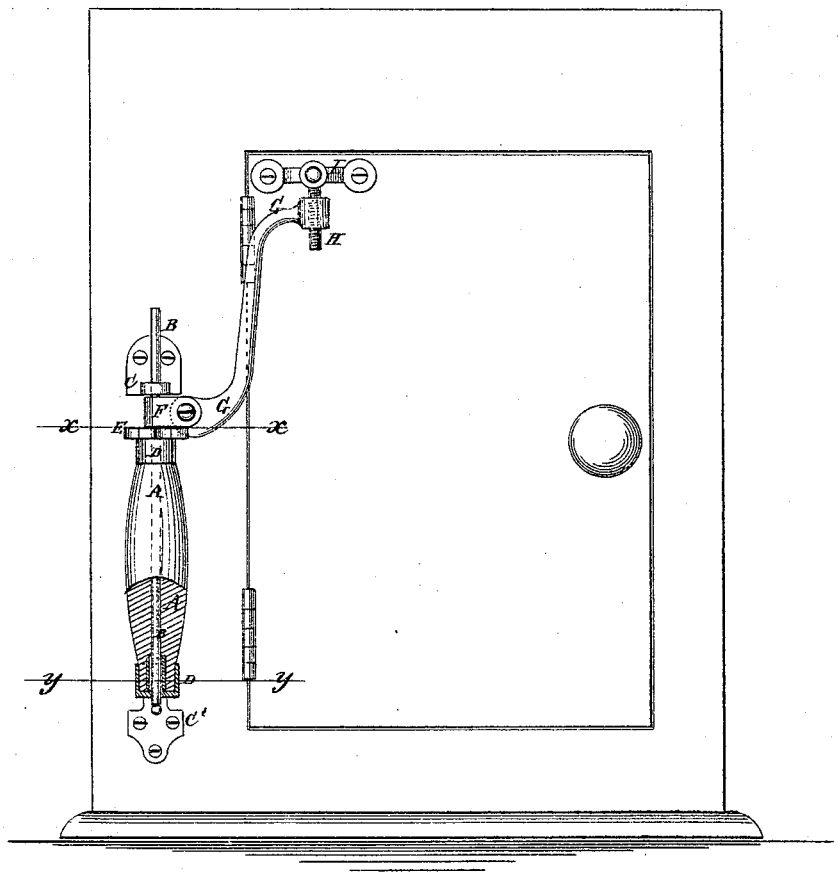
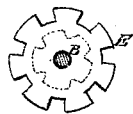
Witnesses:
A. W. Almqvist
N. O. Graham
Inventor:
James Losee
per Munn & Co.
Attorneys.

UNITED STATES PATENT OFFICE.

JAMES LOSEE, OF PEEKSKILL, NEW YORK, ASSIGNOR TO HIMSELF AND JOSEPH L. COOK, OF SAME PLACE.

IMPROVEMENT IN DOOR-SPRINGS.

Specification forming part of Letters Patent No. 129,574, dated July 16, 1872.

Specification describing a new and useful Improvement in Door-Spring, invented by JAMES LOSEE, of Peekskill, in the county of Westchester and State of New York.

Figure 1 is a side view of my improved door-spring shown as applied to a door, and part being broken away to show the construction. Fig. 2 is a detail sectional view of the same taken through the line $xx$, Fig. 1. Fig. 3 is a detail sectional view of the same taken through the line $yy$, Fig. 2. Fig. 4 is a detail view of the lower end of the connecting-rod.

Similar letters of reference indicate corresponding parts.

My invention relates to an improvement in the class of springs which are arranged vertically or parallel to the hinges of the door and have a torsional action; and it consists in the employment of a rubber cylinder, a spindle, a notched disk, curved connecting arm or rod, and a screw, so arranged that the degree of torsion and longitudinal compression of the cylinder may be governed by adjusting said disk and screw, as hereinafter described.

A is a rubber cylinder, having a hole formed longitudinally through it to receive the spindle B, the ends of which pass through and work in holes in the lugs or brackets C attached to the door-posts. The ends of the rubber cylinder A are inserted in thimbles or caps D, which have points or corrugations formed upon their inner surface to prevent them from moving upon the rubber, as shown in Fig. 3 and in dotted lines in Fig. 2. In the lower end of the rubber cylinder A, or in both its ends, is placed a tubular washer to prevent the rubber from being compressed upon the said spindle B. Upon the upper thimble D is formed, or to it is rigidly attached, a notched flange-wheel or disk, E. To the spindle B, above the upper end of the rubber cylinder A and below the upper lug or bracket C, is rigidly attached, or upon it is formed, a lug or projection, F, to which is pivoted the lower end of the connecting-rod G. The lower end of the connecting-rod G has a short slot formed in it to receive the pivoting-bolt, as shown in Fig. 4 and in dotted line in Fig. 1, so that the said rod G can be moved longitudinally to raise it out of and drop it into the notches of the flange or wheel E. The end parts of the rod G are bent slightly in opposite directions, giving it somewhat of an S form, as shown in Fig. 1, and in its upper end is formed a screw-hole to receive the screw of the bolt H, which has an eye formed in its upper end to enable it to be slipped over a pivot, I, attached to the door.

By this construction, as the door is opened the rubber cylinder A is both compressed and twisted, so as, when the door is released, to close the said door by the elasticity of the said rubber. The upward pressure of the rubber also tends to support the door, thus relieving the hinges and preventing the door from sagging. The force with which the spring A acts may be regulated by slipping the eye of the bolt H from the pivot I and turning the said bolt up or down, or by raising the lower end of the rod G out of the notch of the wheel or flange E and giving the rubber cylinder A more or less twist. When the spring is not required, the eye of the bolt H is slipped from the pivot I, the rod G is raised to lift its lower end out of the notch of the flange or wheel E, is turned partially around, and dropped into a notch on the other side of said flange or wheel E, so as to be out of the way, and so as to adapt the rubber cylinder A to act as a stop to the door when it is opened.

Having thus described my invention, I claim as new and desire to secure by Letters Patent—

1. The notched flange or wheel E, in combination with the rubber cylinder A, spindle B, and connecting-rod G, substantially as herein shown and described, and for the purposes set forth.

2. The eyebolt H, in combination with the pivot I and end of the connecting-rod G, for adjustably connecting the spring with the door, substantially as herein shown and described, and for the purpose set forth.

3. An improved door-spring, composed of the rubber cylinder A, spindle B, lugs or brackets C C', lug or projection F, notched flange or wheel E, connecting-rod G, screw-eyebolt H, and pivot I, said parts being constructed, arranged, and operating substantially as herein shown and described, and for the purposes set forth.

JAMES LOSEE.

Witnesses:
S. R. KNAPP,
MILTON FROST.